United States Patent
Bai et al.

(10) Patent No.: US 11,853,180 B1
(45) Date of Patent: Dec. 26, 2023

(54) PROCESS DETECTION SYSTEM FOR RACK AND SERVER IN RACK

(71) Applicants: Inventec (Pudong) Technology Corporation, Shanghai (CN); Inventec Corporation, Taipei (TW)

(72) Inventors: Yuan Bai, Shanghai (CN); Fu-Cheng Liu, Shanghai (CN)

(73) Assignees: Inventec (Pudong) Technology, Shanghai (CN); Corporation Inventec Corporation, Taipei (TW)

( * ) Notice: Subject to any disclaimer, the term of this patent is extended or adjusted under 35 U.S.C. 154(b) by 0 days.

(21) Appl. No.: 17/948,682

(22) Filed: Sep. 20, 2022

(30) Foreign Application Priority Data

Sep. 6, 2022 (CN) .......................... 202211083127.5

(51) Int. Cl.
*G06F 11/00* (2006.01)
*G06F 11/22* (2006.01)
*G06F 11/20* (2006.01)
*G06F 11/26* (2006.01)

(52) U.S. Cl.
CPC .......... *G06F 11/2273* (2013.01); *G06F 11/20* (2013.01); *G06F 11/26* (2013.01)

(58) Field of Classification Search
CPC ....... G06F 11/2273; G06F 11/20; G06F 11/26
USPC .......................................... 714/1–57
See application file for complete search history.

(56) References Cited

U.S. PATENT DOCUMENTS

2022/0036320 A1* 2/2022 Anshul ................... G06N 7/01

* cited by examiner

*Primary Examiner* — Sarai E Butler
(74) *Attorney, Agent, or Firm* — David R. Stevens; Stevens Law Group

(57) ABSTRACT

A process detection system for rack and server in rack is disclosed. In the system, a detection device performs a server process detection of L10 stage on servers in a rack, and performs a rack process detection of L11 stage; when the detection device detects that a server in the rack fails in a server process during the server process detection of L10 stage or that the rack fails in a rack process during the rack process detection of L11 stage, the server is repaired, or replaced by a backup server. Before the detection flow is performed continuously, the server process detection of L10 stage is performed on the repaired server, or the backup server not performing the server process detection of L10 stage yet, and then. The detection flow can be performed continuously on the backup server which has performed the server process detection of L10 stage.

9 Claims, 7 Drawing Sheets

PROCESS DETECTION SYSTEM FOR RACK AND SERVER IN RACK

CROSS-REFERENCE TO RELATED APPLICATION

This application claims the benefit of Chinese Application Serial No. 202211083127.5, filed Sep. 6, 2022, which is hereby incorporated herein by reference in its entirety.

BACKGROUND OF THE INVENTION

1. Field of the Invention

The present invention relates to a detection system, and more particularly to a process detection system for rack and server in rack.

2. Description of the Related Art

The conventional solution for detecting a rack and a server set in the rack is to perform a server process detection of L10 stage and a rack process detection of L11 stage, respectively, and when a problem is detected in one of the server process detection of L10 stage and the rack process detection of L11 stage, both of the server process detection of L10 stage and the rack process detection of L11 stage are interrupted, and it must release the binding relationship between the server and the rack to solve the problem; next, the server process detection of L10 stage and the rack process detection of L11 stage must be performed on the rack and the server set in the rack again after the problem is solved; as a result, the conventional solution causes the detection of the rack and the server set in the rack to consume extra detection time.

According to above-mentioned contents, what is needed is to develop an improved solution to solve the conventional problem that the conventional detection flow of the rack and the server set in the rack consumes extra detection time.

SUMMARY OF THE INVENTION

An objective of the present invention discloses a process detection system for rack and server in rack, to solve the problem that the conventional detection flow of a rack and a server set in the rack consumes extra detection time.

In order to achieve the objective, a first embodiment of the present invention discloses a process detection system for rack and server in rack, and the process detection system includes a rack, and a detection device. The rack includes servers disposed therein. The detection device is configured to establish interconnection with the rack and execute a detection process, wherein during the detection process, the detection device performs a server process detection of L10 stage on each of the servers in the rack; when the detection device detects that one of the servers in the rack fails in a server process during a server process detection of L10 stage, the one of the servers is removed from the rack to repair; after the one of the servers is repaired completely, the one of the servers is set in the rack again, the detection device performs the server process detection of L10 stage on the one of the servers set again; when the detection device detects that the all of the servers in the rack perform successfully the server process during the server process detection of L10 stage, the detection device performs a rack process detection of L11 stage on the rack; when the detection device detects that one of the servers in the rack fails in a rack process during the rack process detection of L11 stage, the one of the servers is removed from the rack to repair; after the one of the servers is repaired completely, the one of the servers is set in the rack again, the detection device performs the server process detection of L10 stage on the server which is set in the rack again, when the detection device detects that the server process is performed successfully, the detection device performs the rack process detection of L11 stage on the rack again.

In order to achieve the objective, a second embodiment of the present invention discloses a process detection system for rack and server in rack, and the process detection system includes a rack, a backup rack, and a detection device. The rack includes servers disposed therein. The backup rack includes backup servers disposed therein. The detection device is configured to establish interconnection with the rack, and execute a detection process, wherein during the detection process, the detection device performs a server process detection of L10 stage on each of the servers in the rack; when the detection device detects that one of the servers in the rack fails in the server process during the server process detection of L10 stage, one of the backup servers is selected from the backup rack, and the one of the servers is replaced by the selected backup server; the detection device performs a server process detection of L10 stage on each of the servers in the rack; when the detection device detects that all of the servers in the rack successfully perform the server process during the server process detection of L10 stage, the detection device performs a rack process detection of L11 stage on the racks; when the detection device detects that one of the servers in the rack fails in the rack process during the rack process detection of L11 stage, one of the backup servers which is not used for replacement yet is selected from the backup rack, and the one of the servers is replaced by the selected backup server; the detection device performs the server process detection of L10 stage on the selected backup server in the rack, when the detection device detects that the server process is performed successfully, the detection device performs the rack process detection of L11 stage on the rack again.

In order to achieve the objective, a third embodiment of the present invention discloses a process detection system for rack and server in rack, and the process detection system includes a rack, a backup rack, and a detection device. The rack includes servers disposed therein. The backup rack includes backup servers disposed therein. The detection device is configured to establish interconnection with the rack and the backup rack, and execute a detection process, wherein during the detection process, the detection device performs a server process detection of L10 stage on each of the servers in the rack; the detection device performs the server process detection of L10 stage on each of the servers in the backup rack; when the detection device detects that one of the servers in the rack fails in a server process during server process detection of L10 stage, one of the backup servers which successfully performs the process during the server process detection of L10 stage is selected from the backup rack, and the one of the servers is replaced by the selected backup server; when the detection device detects that all of the servers in the rack successfully perform the server process during the server process detection of L10 stage, the detection device performs a rack process detection of L11 stage on the rack; when the detection device detects that one of the servers in the rack fails in the rack process during the rack process detection of L11 stage, the backup server which is not used for replacement is selected from the backup rack, and the one of the servers is replaced by the selected backup server; the detection device performs the rack process detection of L11 stage on the rack again.

According to the above-mentioned system of the present invention, the difference between the present invention and the conventional technology is that, in the system, the detection device performs the server process detection of L10 stage on each server in the rack, and then performs the rack process detection of L11 stage; when the detection device detects that one of the servers in the rack fails in the server process during the server process detection of L10 stage or that the rack fails in a rack process during the rack process detection of L11 stage, the one of the servers is repaired, or replaced by the backup server. Next, the server process detection of L10 stage is first performed on the repaired server, or the backup server not performing the server process detection of L10 stage yet, and then the detection flow is performed continuously. In an embodiment, the detection flow can be performed on the backup server which has performed the server process detection of L10 stage.

Therefore, the above-mentioned solution of the present invention is able to achieve the technical effect of reducing times of the detection flow for the rack and the server set in the rack.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
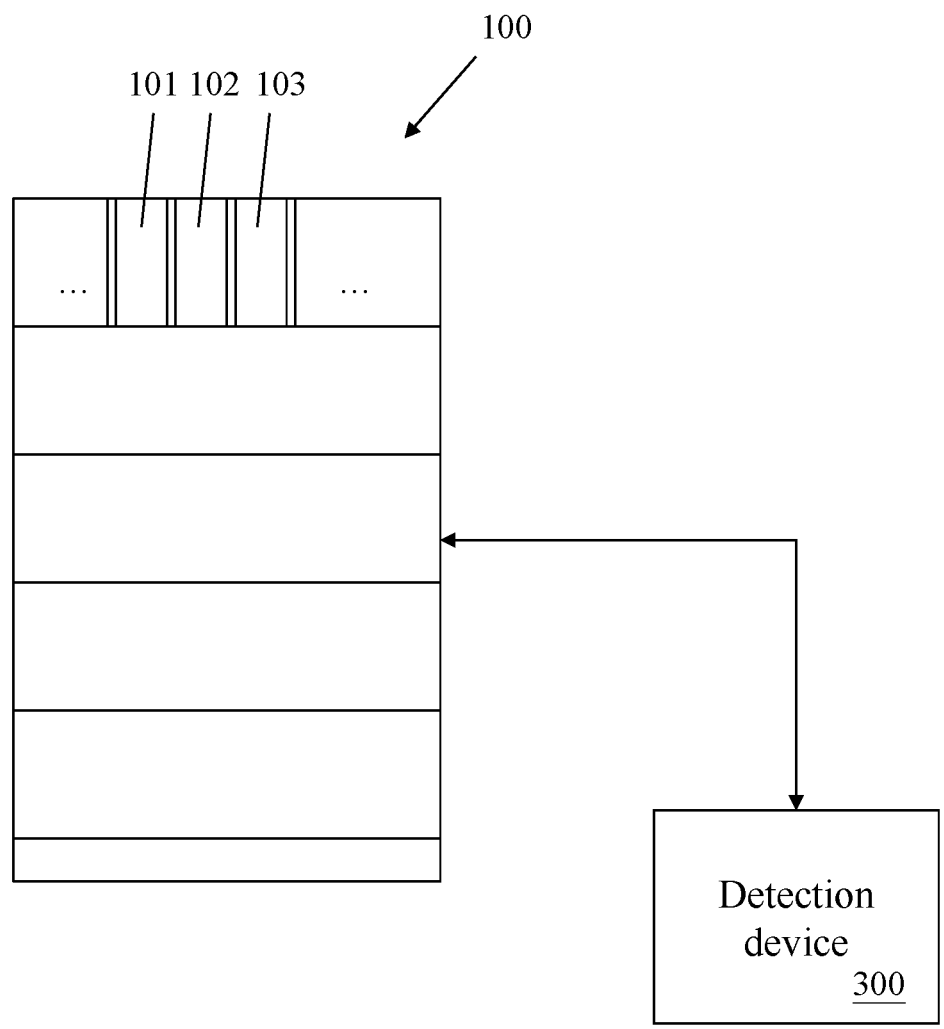
FIG. 1 is a schematic architecture diagram of a first embodiment of a process detection of a rack and a server set in the rack, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

The first embodiment of a process detection system for rack and server in rack will be illustrated in the following paragraph. Please refer to FIG. 1, which is a schematic architecture diagram of a first embodiment of process detection of a rack and a server set in the rack, according to the present invention.

The first embodiment of the present invention discloses a process detection system for rack and server in rack, and the process detection system includes a rack 100 and a detection device 300, the rack 100 includes a first server 101, a second server 102, and a third server disposed therein; however, these examples are merely for exemplary illustration, and the application field of the present invention is not limited to these examples. The detection device 300 is configured to establish interconnection with the rack 100 and execute a detection process.

In the detection process, the detection device 300 performs a server process detection of L10 stage on the first server 101, the second server 102 and the third server 103 in the rack 100. For example, the server process detection of L10 stage can include a server assembly detection, a preliminary server detection, a server upgrade firmware detection, a server basic function detection, a server configuration detection, a server stress test detection, a secondary basic-function detection after server stress test, and a server system log detection; however, these examples are merely for exemplary illustration, and the application field of the present invention is not limited to these examples.

In the first embodiment, when the detection device 300 detects that the first server 101 in the rack 100 fails in the server process during the server process detection of L10 stage, the first server 101 is removed from the rack 100 to repair. After the first server 101 is repaired completely, the first server 101 is set in the rack 100 again, the detection device 300 performs the server process detection of L10 stage on the first server 101 set in the first server 101 again.

When the detection device 300 detects that all of the first server 101, the second server 102 and the third server 103 in the rack 100 perform the server process successfully during server process detection of L10 stage, the detection device 300 performs a rack process detection of L11 stage on the rack 100. For example, the rack process detection of L11 stage can include a rack assembly detection, a rack stress test detection, a basic function detection after rack stress test, and a configuration detection after rack stress test; however, these examples are merely for exemplary illustration, and the application field of the present invention is not limited to these examples.

When the detection device 300 detects that the third server 103 in the rack 100 fails in the rack process during the rack process detection of L11 stage, the third server 103 is removed from the rack 100 to repair; after the third server 103 is repaired completely, the third server 103 is set in the rack 100 again and the detection device 300 performs the server process detection of L10 stage on the third server 103 which is set in the third server 103 again; when the detection device 300 detects that the server process is performed successfully, the detection device 300 performs the rack process detection of L11 stage on the rack 100 again.

Figure 2A:
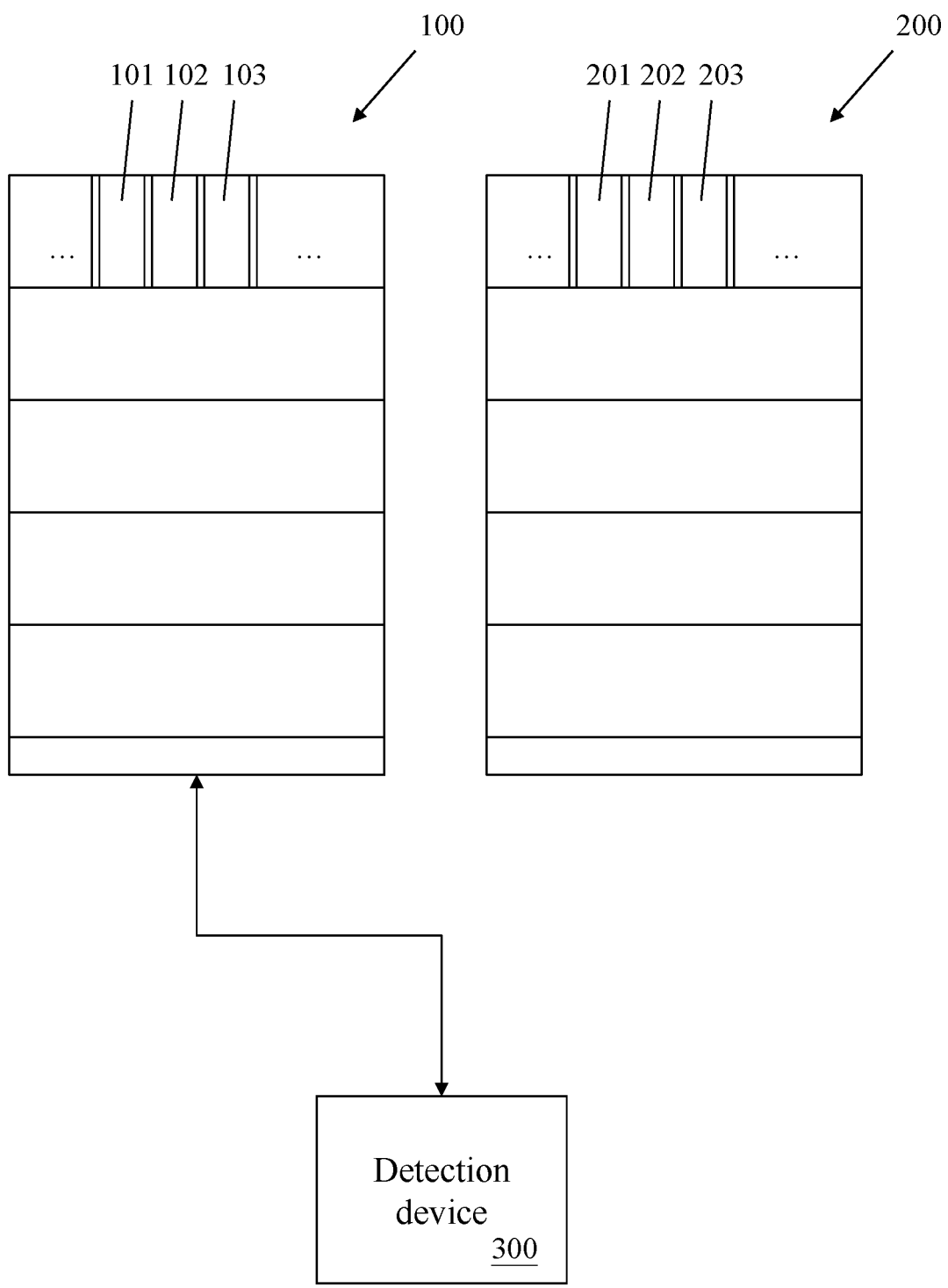
FIG. 2A is a schematic architecture diagram of a second embodiment of a process detection for a rack and a server set in the rack, according to the present invention.

A second embodiment of the present invention will be illustrated in the following paragraphs. Please refer to FIG. 2A, which is a schematic architecture diagram of a second embodiment of process detection for a rack and a server set in the rack, according to the present invention.

The second embodiment of the present invention discloses a process detection system for rack and server in rack, and the process detection system includes a rack 100, a backup rack 200, and a detection device 300. The rack 100 includes a first server 101, a second server 102, and a third server 103 disposed therein, but these examples are merely for exemplary illustration, and the application field of the present invention is not limited to these examples. The backup rack 200 includes a first backup server 201, a second backup server 202, and a third backup server 203 disposed therein, but these examples are merely for exemplary illustration, and the application field of the present invention is not limited to these examples. The detection device 300 establishes interconnection with the rack 100 and execute a detection process described in the following paragraphs.

In the detection process, the detection device 300 performs a server process detection of L10 stage on the first server 101, the second server 102 and the third server 103. For example, the server process detection of L10 stage can include a server assembly detection, a preliminary server detection, a server upgrade firmware detection, a server basic function detection, a server configuration detection, a server stress test detection, a secondary basic-function detection after server stress test, and a server system log detection; however, these examples are merely for exemplary illustration, and the application field of the present invention is not limited to these examples.

Figure 2B:
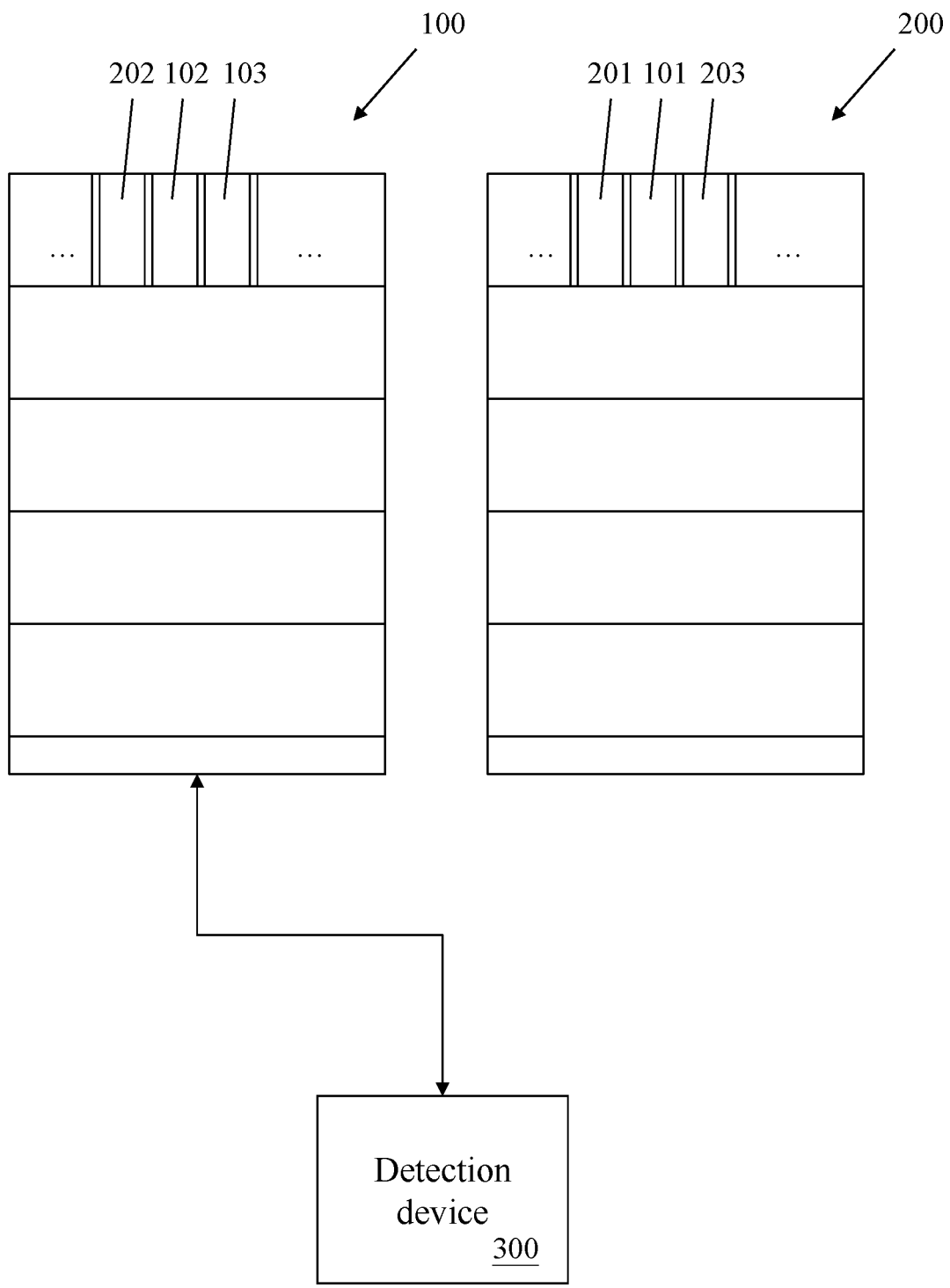
FIG. 2B is a schematic diagram of server replacement in process detection of a rack and a server set in the rack, according to the second embodiment of the present invention.

In the second embodiment, when the detection device 300 detects that the first server 101 in the rack 100 fails in the server process during the server process detection of L10 stage, the second backup server 202 is selected from the backup rack 200, and the first server 101 is replaced by the selected second backup server 202; next, the detection device 300 performs the server process detection of L10 stage on the second backup server 202 in the rack 100, as shown in FIG. 2B, which schematically shows the server replacement between the first server 101 and the second backup server 202. FIG. 2B is a schematic diagram of the server replacement in process detection of a rack and a server set in the rack, according to the second embodiment of the present invention.

Figure 2C:
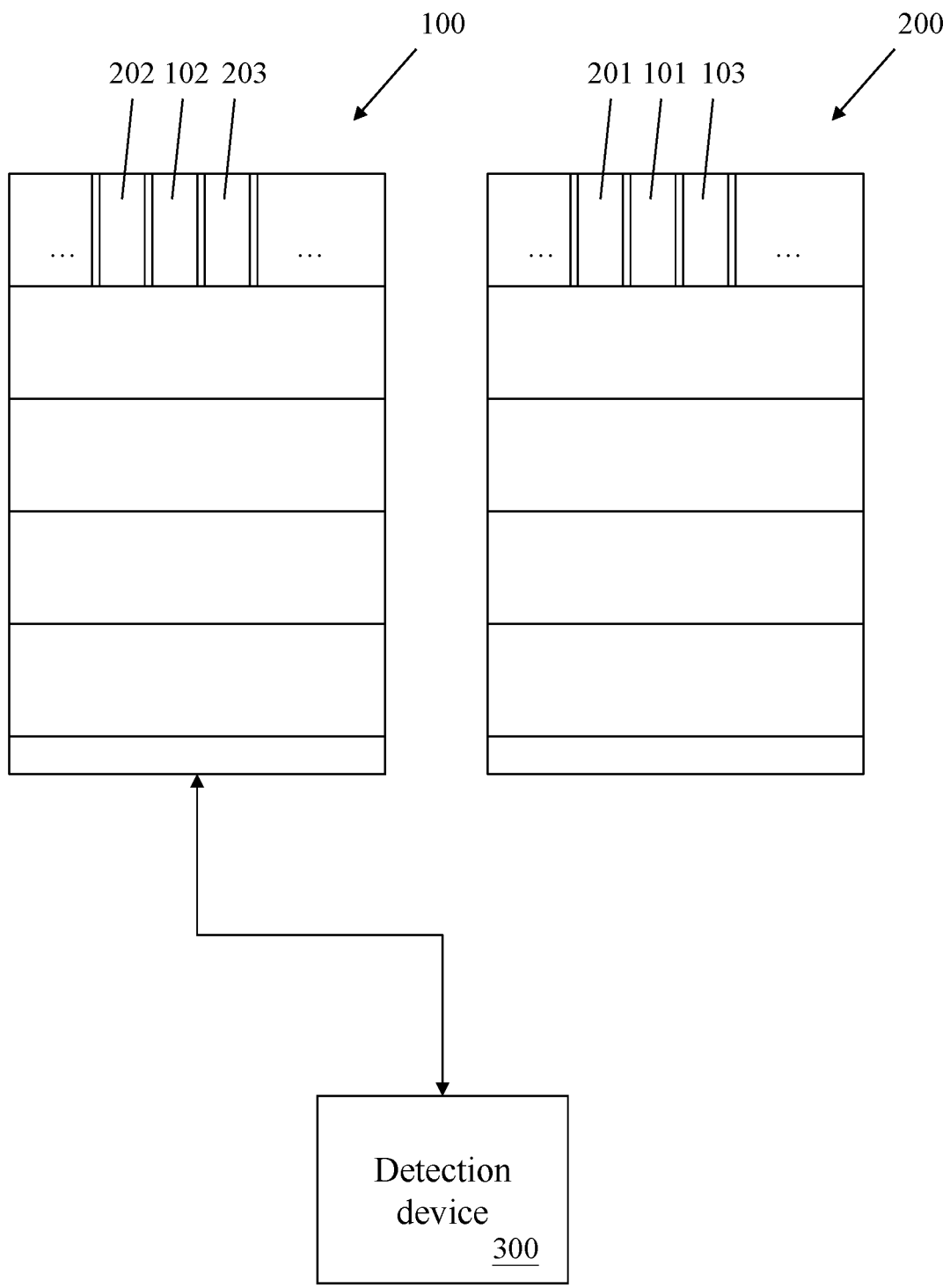
FIG. 2C is a schematic diagram of server replacement in process detection of a rack and a server set in the rack, according to the second embodiment of the present invention.

When the detection device 300 detects that all of the second backup server 202, the second server 102 and the third server 103 perform the server process 300 successfully during server process detection of L10 stage, the detection device 300 performs a rack process detection of L11 stage on the rack 100. For example, the rack process detection of L11 stage can include a rack assembly detection, a rack stress test detection, a basic function detection after rack stress test, and a configuration detection after rack stress test, but these examples are merely for exemplary illustration, and the application field of the present invention is not limited to these examples.

when the detection device 300 detects that the third server 103 in the rack 100 fails in the rack process during the rack process detection of L11 stage, the third backup server 203, which is not used for replacement, is selected from the backup rack 200, and the third server 103 is replaced by the selected third backup server 203, as shown in FIG. 2C, which schematically shows replacement between the third server 103 and the third backup server 203. FIG. 2C is a schematic diagram of server replacement in process detection of a rack and a server set in the rack, according to the second embodiment of the present invention.

The detection device 300 performs the server process detection of L10 stage on the third backup server 203 in the rack 100 first; when the detection device 300 detects that the server process is performed successfully, the detection device 300 performs the rack process detection of L11 stage on the rack 100 again.

Figure 3A:
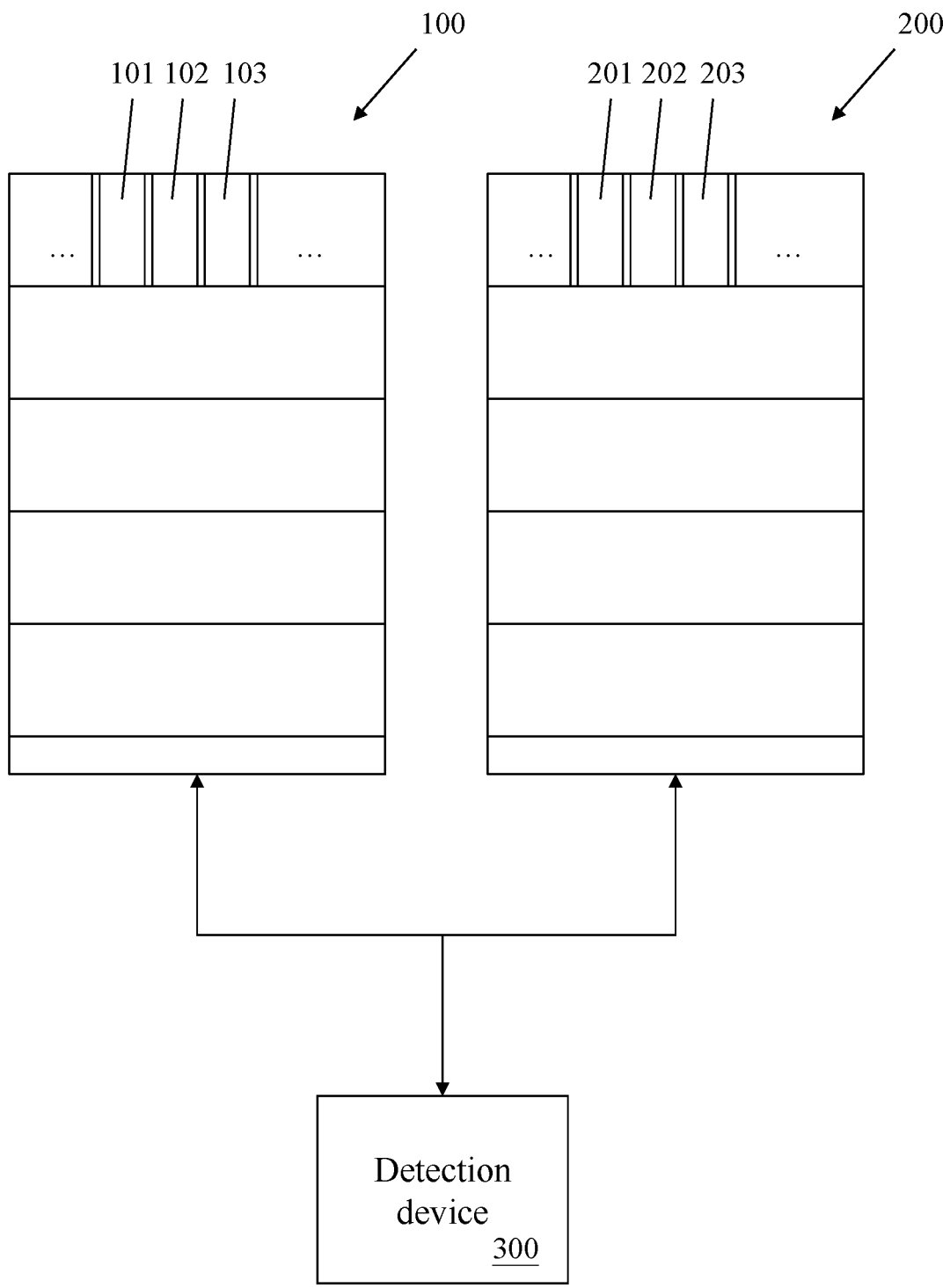
FIG. 3A is a schematic architecture diagram of a third embodiment of process detection of a rack and a server set in the rack, according to the present invention.

A third embodiment of a process detection system for rack and server in rack will be illustrated in the following paragraphs. Please refer to FIG. 3A, which is a schematic architecture diagram of a third embodiment of process detection of a rack and a server set in the rack, according to the present invention.

The third embodiment of the present invention discloses a process detection system for rack and server in rack, and the process detection system includes a rack 100, a backup rack 200, and a detection device 300. The rack 100 includes a first server 101, a second server 102, and a third server 103 disposed therein, but these examples are merely for exemplary illustration, and the application field of the present invention is not limited to these examples. The backup rack 200 includes a first backup server 201, a second backup server 202, and a third backup server 203 disposed therein, but these examples are merely for exemplary illustration, and the application field of the present invention is not limited to these examples. The detection device 300 establishes interconnection with the rack 100 and the backup rack 200, and executes a detection process described in the following paragraphs.

The detection device 300 performs a server process detection of L10 stage on the first server 101, the second server 102 and the third server 103, and performs the server process detection of L10 stage on the first backup server 201, the second backup server 202 and the third backup server 203. For example, the server process detection of L10 stage can include a server assembly detection, a preliminary server detection, a server upgrade firmware detection, a server basic function detection, a server configuration detection, a server stress test detection, a secondary basic-function detection after server stress test, and a server system log detection; however, these examples are merely for exemplary illustration, and the application field of the present invention is not limited to these examples.

Figure 3B:
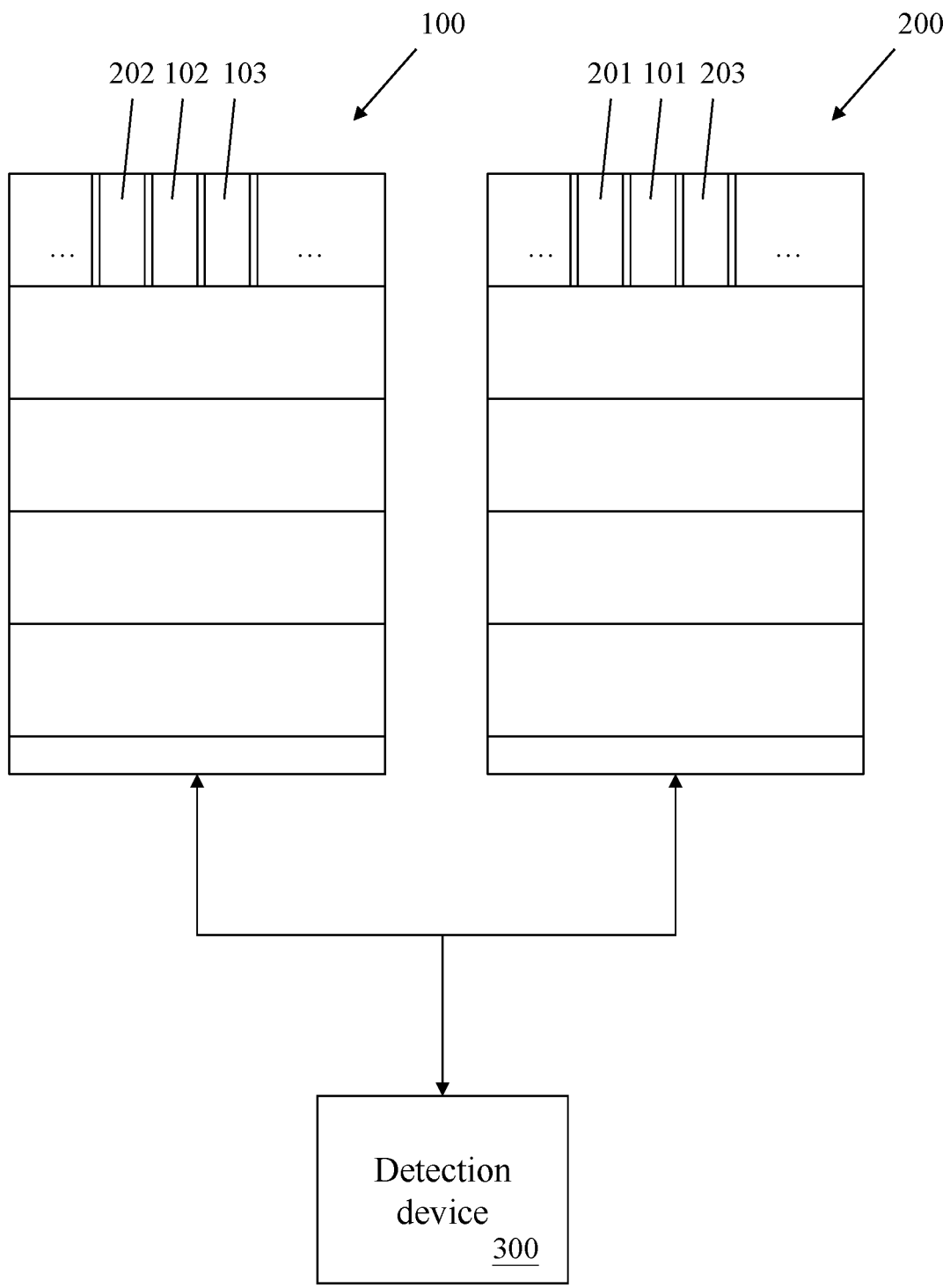
FIG. 3B is a schematic diagram of server replacement in process detection of a rack and a server set in the rack, according to a third embodiment of the present invention.

In the third embodiment, when the detection device 300 detects that the first server 101 in the rack 100 fails in the server process during the server process detection of L10 stage, the second backup server 202, which successfully perform the server process during the server process detection of L10 stage, is selected from the backup rack 200, and the first server 101 is replaced by the selected second backup server 202. Since the detection device 300 detects that the second backup server 202 performs the server process successfully, there is no need to perform the server process detection of L10 stage on the second backup server 202 the first server 101 is replaced by the second backup server 202, as shown in FIG. 3B, which schematically shows replacement between the first server 101 and the second backup server 202. FIG. 3B is a schematic diagram of server replacement in process detection of a rack and a server set in the rack, according to a third embodiment of the present invention.

When the detection device 300 detects that all of the second backup server 202, the second server 102 and the third server 103 perform the server process successfully during the server process detection of L10 stage, the detection device 300 performs a rack process detection of L11 stage on the rack 100. For example, the rack process detection of L11 stage can include a rack assembly detection, a rack stress test detection, a basic function detection after rack stress test, and a configuration detection after rack stress test; however, these examples are merely for exemplary illustration, and the application field of the present invention is not limited to these examples.

Figure 3C:
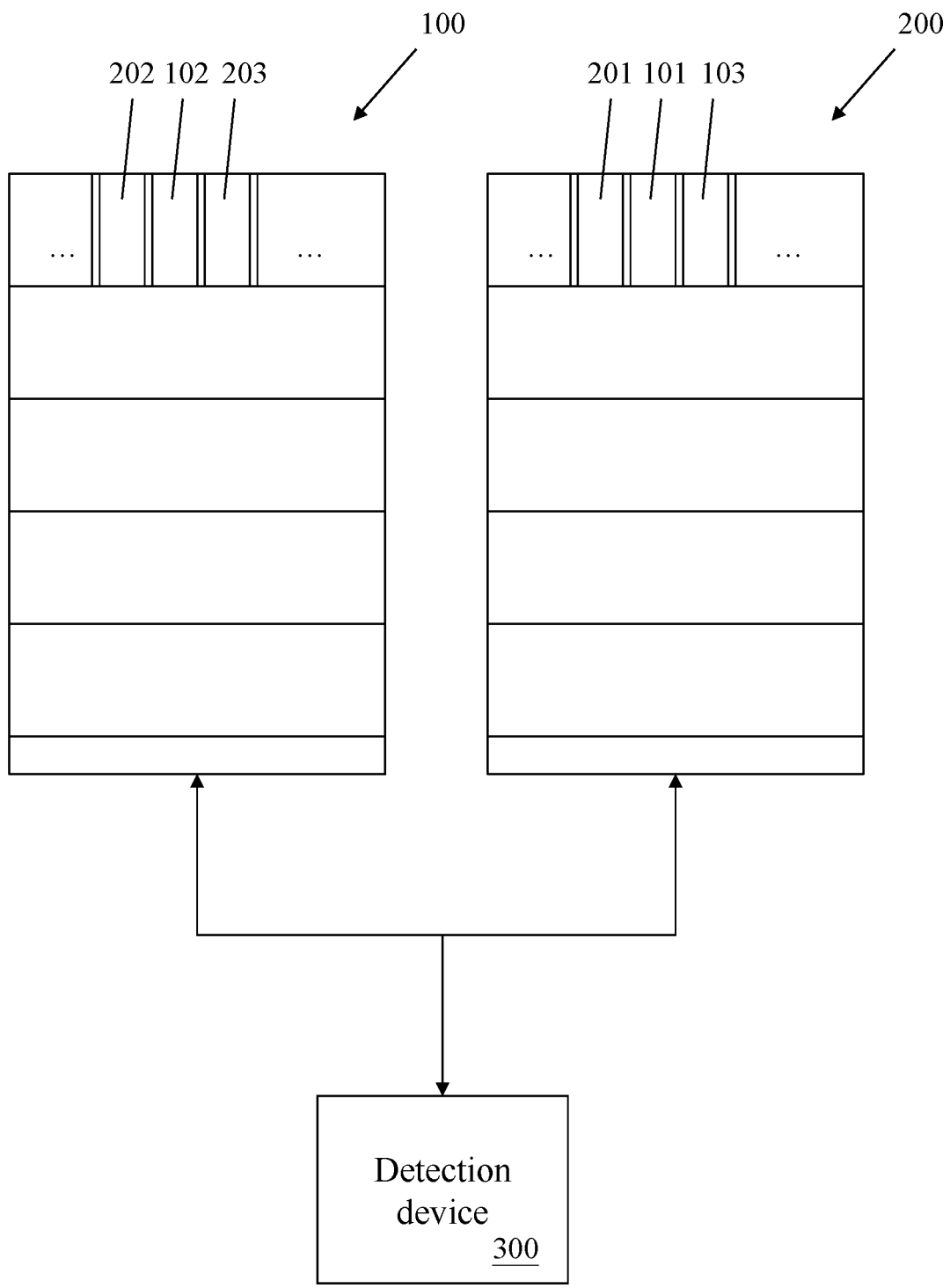
FIG. 3C is a schematic diagram of server replacement in process detection of a rack and a server set in the rack, according to a third embodiment of the present invention.

When the detection device 300 detects that the third server 103 in the rack 100 fails in the rack process during the rack process detection of L11 stage, the third backup server 203, which is not used for replacement, is selected from the backup rack 200, and the third server 103 is replaced by the selected third backup server 203. Since the detection device 300 detects that the third backup server 203 performs the server process successfully, there is no need to perform the server process detection of L10 stage on the third backup server 203 after the third server 103 is replaced by the third backup server 203, as shown in FIG. 3C, which schematically shows replacement between the third server 103 and the third backup server 203. FIG. 3C is a schematic diagram of server replacement in process detection of a rack and a server set in the rack, according to a third embodiment of the present invention. The detection device 300 performs the rack process detection of L11 stage on the rack 100 again.

According to above-mentioned contents, the difference between the present invention and the conventional technology is that, in the present invention, the detection device performs the server process detection of L10 stage on each server in the rack, and then performs the rack process detection of L11 stage; when the detection device detects that one of the servers in the rack fails in the server process during the server process detection of L10 stage or that the rack fails in a rack process during the rack process detection of L11 stage, the one of the servers is repaired, or replaced by the backup server. Next, the server process detection of L10 stage is first performed on the repaired server, or the backup server not performing the server process detection of L10 stage yet, and then the detection flow is performed continuously. In an embodiment, the detection flow can be performed on the backup server which has performed the server process detection of L10 stage.

Therefore, the above-mentioned solution of the present invention is able to solve the problem that the conventional detection flow of a rack and a server set in the rack consumes extra detection time, thereby achieving the technical effect of reducing times of the detection flow for the rack and the server set in the rack.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A process detection system for rack and server in rack, comprising:
   a rack, comprising servers disposed therein; and
   a detection device, configured to establish interconnection with the rack and execute a detection process, wherein during the detection process,
   the detection device performs a server process detection of L10 stage on each of the servers in the rack,
   when the detection device detects that one of the servers in the rack fails in a server process during a server process detection of L10 stage, the one of the servers is removed from the rack to repair,
   after the one of the servers is repaired completely, the one of the servers is set in the rack again, the detection device performs the server process detection of L10 stage on the one of the servers set again,
   when the detection device detects that the all of the servers in the rack perform successfully the server process during the server process detection of L10 stage, the detection device performs a rack process detection of L11 stage on the rack,
   when the detection device detects that one of the servers in the rack fails in a rack process during the rack process detection of L11 stage, the one of the servers is removed from the rack to repair, and
   after the one of the servers is repaired completely, the one of the servers is set in the rack again, the detection device performs the server process detection of L10 stage on the server which is set in the rack again, when the detection device detects that the server process is performed successfully, the detection device performs the rack process detection of L11 stage on the rack again.

2. The process detection system for rack and server in rack according to claim 1, wherein the server process detection of L10 stage comprises a server assembly detection, a preliminary server detection, a server upgrade firmware detection, a server basic function detection, a server configuration detection, a server stress test detection, a secondary basic-function detection after server stress test, and a server system log detection.

3. The process detection system for rack and server in rack according to claim 1, wherein the rack process detection of L11 stage comprises a rack assembly detection, a rack stress test detection, a basic function detection after rack stress test, and a configuration detection after rack stress test.

4. A process detection system for rack and server in rack, comprising a rack, comprising servers disposed therein; a backup rack, comprising backup servers disposed therein; and a detection device, configured to establish interconnection with the rack, and execute a detection process, wherein during the detection process, the detection device performs a server process detection of L10 stage on each of the servers in the rack, when the detection device detects that one of the servers in the rack fails in a server process during the server process detection of L10 stage, one of the backup servers is selected from the backup rack, and the one of the servers is replaced by the selected backup server, the detection device performs a server process detection of L10 stage on each of the servers in the rack, when the detection device detects that all of the servers in the rack successfully perform the server process during the server process detection of L10 stage, the detection device performs a rack process detection of L11 stage on the rack, when the detection device detects that one of the servers in the rack fails in a rack process during the rack process detection of L11 stage, the detection device selects one of the backup servers, which is not used for replacement yet, from the backup rack, and the one of the servers is replaced by the selected backup server, and the detection device performs the server process detection of L10 stage on the selected backup server in the rack, when the detection device detects that the server process is performed successfully, the detection device performs the rack process detection of L11 stage on the rack again.

5. The process detection system for rack and server in rack according to claim 4, wherein the server process detection of L10 stage comprises a server assembly detection, a preliminary server detection, a server upgrade firmware detection, a server basic function detection, a server configuration detection, a server stress test detection, a secondary basic-function detection after server stress test, and a server system log detection.

6. The process detection system for rack and server in rack according to claim 4, wherein the rack process detection of L11 stage comprises a rack assembly detection, a rack stress test detection, a basic function detection after rack stress test, and a configuration detection after rack stress test.

7. A process detection system for rack and server in rack, comprising: a rack, comprising servers disposed therein; a backup rack, comprising backup servers disposed therein; and a detection device, configured to establish interconnection with the rack and the backup rack, and execute a detection process, wherein during the detection process, the detection device performs a server process detection of L10 stage on each of the servers in the rack, the detection device performs the server process detection of L10 stage on each of the servers in the backup rack, when the detection device detects that one of the servers in the rack fails in a server process during server process detection of L10 stage, one of the backup servers which successfully performs the server process during the server process detection of L10 stage is selected from the backup rack, and the one of the servers is replaced by the selected backup server, when the detection device detects that all of the servers in the rack successfully perform the server process during the server process detection of L10 stage, the detection device performs a rack process detection of L11 stage on the rack, when the detection device detects that one of the servers in the rack fails in a rack process during the rack process detection of L1 stage, the backup server which is not used for replacement is selected from the backup rack, and the one of the servers is replaced by the selected backup server, and the detection device performs the rack process detection of L11 stage on the rack again.

8. The process detection system for rack and server in rack according to claim 7, wherein the server process detection of L10 stage comprises a server assembly detection, a preliminary server detection, a server upgrade firmware detection, a server basic function detection, a server configuration detection, a server stress test detection, a secondary basic-function detection after server stress test, and a server system log detection.

9. The process detection system for rack and server in rack according to claim 7, wherein the rack process detection of L11 stage comprises a rack assembly detection, a rack stress test detection, a basic function detection after rack stress test, and a configuration detection after rack stress test.

* * * * *